Patented Feb. 6, 1951

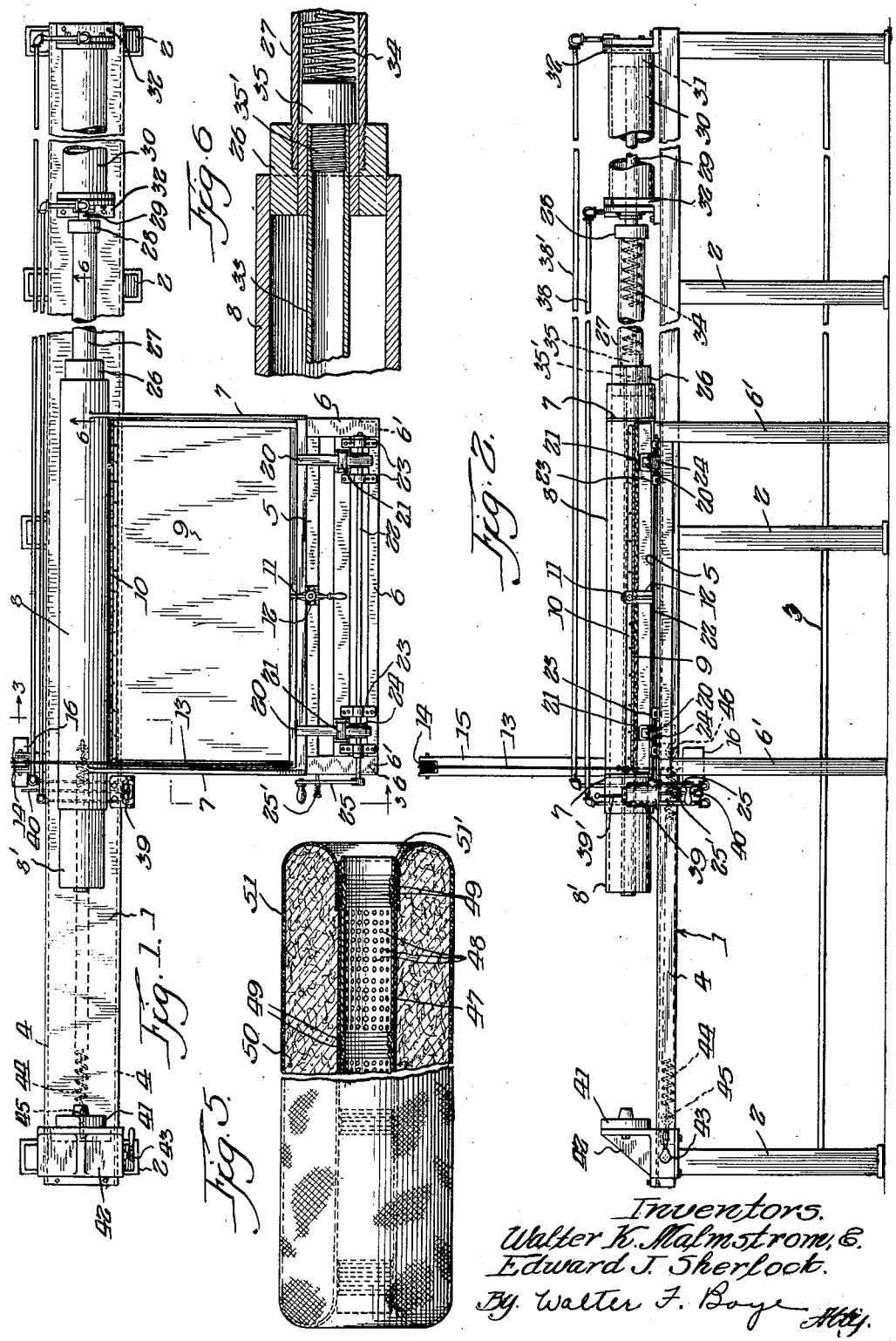

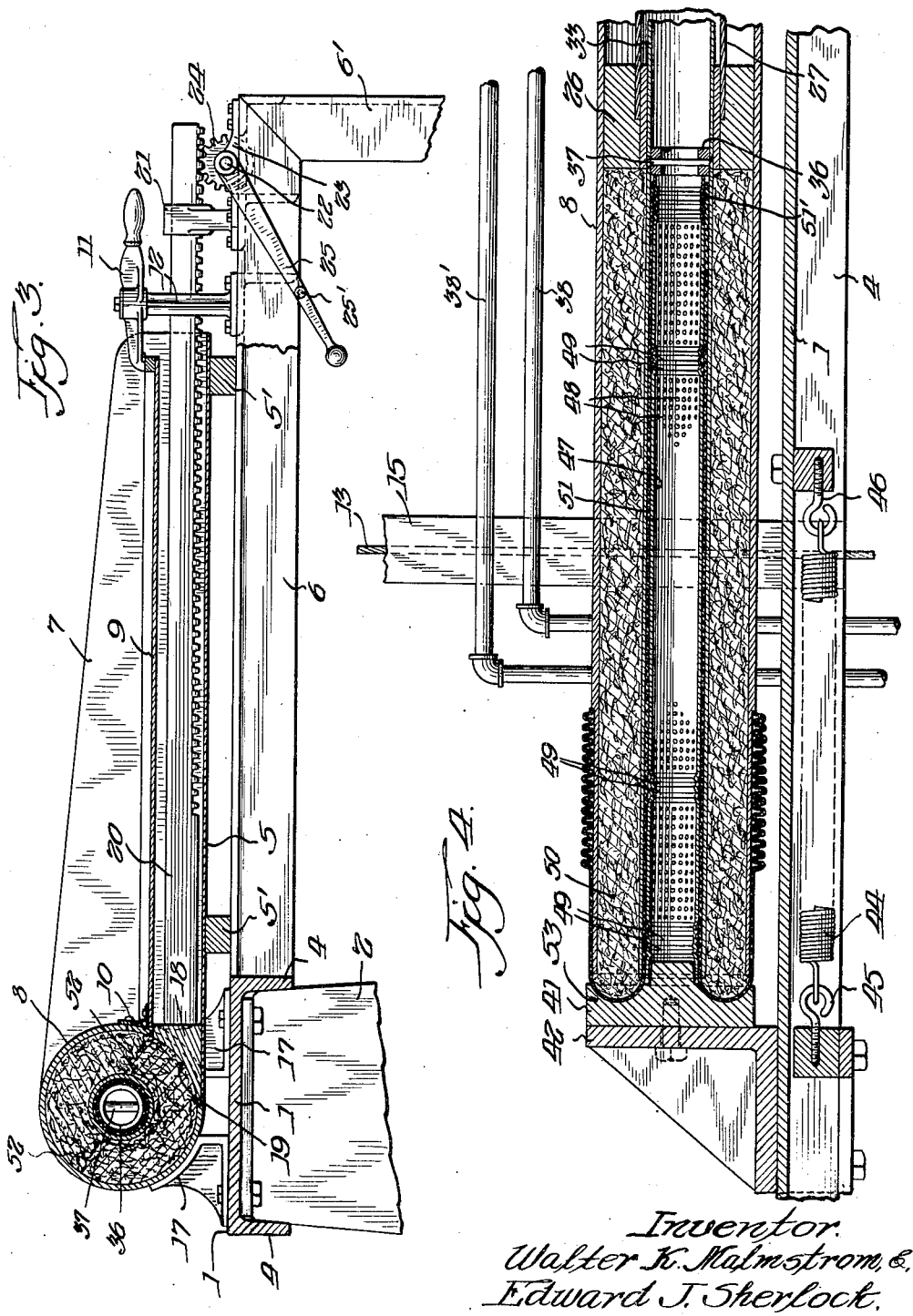

2,540,272

UNITED STATES PATENT OFFICE 2,540,272

FILTER ELEMENT PRODUCING MACHINE AND METHOD OF FILTER PRODUCTION

Walter K. Malmstrom and Edward J. Sherlock, Chicago, Ill.

Application March 26, 1949, Serial No. 83,606

10 Claims. (Cl. 226—19)

This invention relates to improvements in the production of filter elements of the type generally used in the lubricant supplying and circulating systems of internal combustion engines, Diesel engines, and other and kindred characters of prime movers for ridding the supplied, circulated and recirculated lubricating oil of dirt, sludge, solids, and other detrimental or harmful matters, and maintaining such oil clear, of good color, and possessed of a high degree of friction reducing quality, as well as effecting material oil consumption and service economies.

It is an object of the invention to provide a machine for producing filters of the above indicated character, wherein the same will be evenly and uniformly bodily compacted or compressed throughout their respective areas, whereby to render them efficient as filtering bodies; also, prevent their disintegration or partial disintegration and/or bodily channeling during subsequent use.

Another object of the invention is to provide a machine capable of effecting the economical production of oil filter elements, each of which will be of wholly corresponding shape, size and grade.

Another and equally important object of the invention is to provide a filter element producing machine which, in addition to compacting the filter body constituting material to proper and effectual density, will cause such body to be neatly and securely jacketed.

A further object of the invention is to provide a machine, such as indicated, by means of which filter material packs of different densities can be effected, and, if desired, the filter bodies produced in different lengths, each a true replica of the other.

It is furthermore an object of the invention to provide a novel and highly meritorious method of producing filter elements, said elements being of limited size but, nevertheless, affording a maximum of oil filtering area, the efficiency of which will be maintained for and during comparatively long periods of use without deterioration and without bodily or partial bodily parting, with a resultant presence of non-filtering channels or similar disintegrations or imperfections therein.

The foregoing, as well as other objects, advantages and meritorious teachings of our invention, will be in part obvious and in part pointed out in the following detailed disclosure thereof, when taken in conjunction with the accompanying drawings, it being understood that the form of the invention presented herein is precise and what is now considered to be the best mode of embodying its principles, but that modifications and changes may be made in specific embodiments without departing from its essential features.

In the drawings:

Figure 1 is a top plan view of the improved machine with parts thereof broken away for convenience of illustration.

Figure 2 is a side elevation of the machine, also with parts thereof broken away for convenience of illustration.

Figure 3 is an enlarged fragmentary vertical transverse section taken on the line 3—3 of Figure 1, looking in the direction in which the arrows point.

Figure 4 is an enlarged fragmentary vertical section of the filter element compacting and forming end of the machine, showing a filtering element in process of being compacted and jacketed.

Figure 5 is a detail of a filtering element produced by the machine, portions of said element being shown in elevation and in section, and an intermediate portion thereof being broken away, and Figure 6 is an enlarged fragmentary detail, in longitudinal section, taken on the line 6—6 of Figure 1, looking in the direction in which the arrows point.

Referring in detail to the drawings, the improved machine comprises an elongated substantially rectangular flat bed 1 supported in a horizontal plane on pillars 2 which may be interbraced, as at 3. Vertical flanges 4 are provided on the opposite parallel sides of said bed. A flat filter material feed table 5 is positioned adjacent an intermediate portion of the bed 2, transversely thereof, being horizontally supported on spaced bars 5' disposed transversely of the same and of the sides of a supporting frame 6 connected to adjacent intermediate portions of the flanged inner side 4 of the bed and having their outer ends fixed to legs 6'. Spaced vertical walls 7 are mounted on the opposite sides of the table and facilitate retention of filter element constituting material thereon as well as its feeding into the filter forming or compacting body 8, hereinafter described in detail. A follower 9, consisting of a flat sheet-like body, of shape and size substantially approximating that of the feed table 5, is horizontally hinged, at 10, to adjacent wall portions of the filter forming body. Said follower is adapted to be swung vertically on its hinged mounting and, at times, to overlie a predetermined amount of filter element constituting material on the feed table, whereby to confine the material against displacement from said table, and further, facilitate its discharge therefrom into the filter forming and compacting body. To lock the free end of the follower in closed operative position, a locking arm 11 is pivotally mounted on a vertical bracket 12 attached to an appropriate portion of the feed table supporting frame 6. One end of the arm is engageable over and with adjacent end portion of said follower. When thus engaged, the follower will be retained in somewhat compressing contact with the filter element constituting material on the feed table, for an obvious purpose. A cable, cord or the like 13, has one end connected to a free end portion of the hinged follower and passes over a pulley 14 mounted on the upper end of a vertical support 15 connected to the outer side portion of the machine bed 1; the remaining end of the cable having a suitable counter-weight 16 attached thereto. Hence, vertical swinging of the follower from a closed operative position to a raised position may be readily effected.

The filter element forming means of the machine consists of an open ended elongated cross-sectionally circular tubular body 8 of appropriate diameter, made of steel or other sufficiently sturdy material. This forming body is immovably seated in supports 17 secured, as shown, to the upper side of the bed 1 intermediately of its ends. Thereby, said forming body is horizontally positioned on and parallel to the bed 1. That portion of the forming body adjacent to and communicating with the inner end of the walled feed table 5 is open, i. e., cut away, in order that filter element constituting material on said table can be fed thereinto. It will be noted that this material inletting opening has its upper side substantially flush or level with or somewhat below the follower 8, hinged at 9.

In order that filter constituting material will be force fed from the feed table 5 into the forming body 8 via its aforesaid inletting opening or way, a pusher head 18 is slidably received on and transversely of the feed table (see Figure 2). The length of the pusher head is such that it is snugly received between the feed table vertical side walls 7, while its depth permits its entry, at times, into said forming body inletting opening to the extent shown in Figure 3. The inner side of the pusher head is transversely curved or dished throughout the length thereof, as at 19. The arc of such curvature substantially corresponds to that of the inner peripheral surface of the forming body, whereby when engaged in the inletting opening of the latter, said pusher head inner side will be flush or contiguous with said inner peripheral surface.

Relatively spaced horizontal rack bars 20 are endwise connected to the outer side of the pusher head 18 and extend transversely over and beyond the feed table 5, where their outer end portions are received through and slidably supported in brackets 21 fixed to appropriate portions of the sides of the supporting frame 6. A horizontal shaft 22, journaled in bearings 23 mounted on the outer end of the frame 6, has spaced pinions 24 mounted on and keyed thereto in positions to individually mesh with the downwardly disposed teeth of the adjacent rack bars. One end of the shaft is extended, as shown in Figures 1 and 2 of the drawings, and fixedly mounts a crank handle 25 thereon, for an obvious purpose. A lock pin 25' is movably mounted on the crank handle and, at times, is engaged with an adjacent portion of the frame 6 to lock said crank handle against rotation.

With rotation of the shaft 22 by the crank handle 25, in a predetermined direction, the pinions 24 thereon will transmit motion to the pusher head connected rack bars. Consequently, the pusher head 18 can be selectively moved toward the forming body 8 into its inletting way, as aforesaid, or it can be moved away from said forming body out of its inletting opening across the feed table 5 to a position in proximity to the outer end of said feed table. Thus, filter element constituting material, arranged on the feed table ahead of the pusher head 18, can be forced from the feed table into the forming body 8 through its inletting opening. By reversing rotation of the shaft 22, the pusher head 18 can be withdrawn from the inletting opening of the forming body and moved over the feed table to its initial starting position in proximity to the free or outer end of the same.

Compacting of the filter element constituting material in the forming body 8, and its forming into a predetermined shape and size, is effected by a tuubular packing head 26 snugly and slidably received within said forming body.

An elongated tubular member 27, of diameter less than the packing head, is disposed longitudinally of the machine bed 1 in co-axial alignment with the forming body 8. One end of the same is engaged with and connected to the packing head, as shown in Figures 2, 4 and 6. The remaining end is coupled, as at 28, to the outer end of a rod 29 received in and longitudinally of a hydraulic or pneumatic ram cylinder 30 and connected to a piston 31 slidable in said cylinder. The cylinder is fixedly mounted on the bed longitudinally of and adjacent one end portion thereof by means of brackets 32.

A tubular mandrel 33, the length of which substantially corresponds to the forming body 8, is arranged in and concentrically thereof. Its inner end and end portion is snugly and slidably supportingly engaged in and through the packing head 26 (see Figures 4 and 6) and, at times, is telescopically engaged in the elongated tubular member 27.

To normally retain the mandrel 33 within the forming body 8, a coiled compression spring 34 is longitudinally received in said member 27. One end of the spring has fixed bearing engagement with the coupling 28. Its remaining or forward end thrustingly bears on the adjacent end of a cylindrical piece 35 slidably received in the tubular member and formed with an outwardly directed co-axial and reduced extension 35'. This extension is engaged in the adjacent end of the mandrel, i. e., that end which abuts the piece 35. Thus, it will be understood that the longitudinal thrust of the compression spring 34, housed by the member 27, will be transmitted to the mandrel through the cylinder piece 35, and that in consequence, said mandrel will be retained wholly within the forming body. However, with rectilinear or longitudinal movement of the elongated tubular member 27 by the ram operated rod 29, said member and the packing head 26 connected thereto, will be permitted to telescopically snugly engage over and along the length of the mandrel, moving from the position shown in dotted lines in Figure 2 to the one shown in Figure 4.

A stop collar 36 is positioned within the mandrel 33 at an appropriate point intermediately of its ends and is immovably connected thereto by a diametrically disposed rivet 37, or the like, for a purpose hereinafter described.

Air or other power fluid is selectively deliverable to the opposite ends of the ram cylinder 30 for causing rectilinear movement of its piston 31 and rod 29 in a predetermined direction, by means of conduits 38 and 38'. The conduits communicate with a suitable valved control 39 (Figures 1 and 2) which has a fluid supply conduit 40 communicatingly connected thereto. By predetermined operation of the control handle 39', fluid can be selectively transmitted to either end of the ram cylinder and exhausted from the opposite end, whereby to drive the piston and rod plus the tubular member 27 and packing head 26 in either of their two directions of travel. In so doing, it will be seen that the packing head 26 can be moved forwardly into and through the forming body 8 over and along the mandrel 33 from the position shown in Figure 2 to that shown in Figure 4, or vice versa.

A centering chuck 41, mounted on the inner side of a carriage 42, slidably tracked for limited longitudinal movement on that end portion of the machine bed 1 opposite the ram cylinder 30, serves to engage and retain the outer end of a filter element (the component parts thereof) in true co-axial alignment with the forming body 8 during and following its production. The slidable mounting portion of the carriage is provided with a screw-lock operable by a handle 43 whereby said carriage, when slidably adjusted to a predetermined position on the machine bed 1, can be securely though releasably locked against movement. A contractile coiled spring 44 is disposed longitudinally of the under side of the machine bed, having one end connected to an adjacent part of the slidable carriage mounting, as at 45, and its remaining end to an inwardly spaced immovable fixture 46, also on the under side of said carriage (see Figures 2 and 4). Thereby, outward sliding movement of the centering chuck carriage on the bed 1, as when its screw-lock is released by the handle 43, will be resisted by the contractile coiled spring, the purpose of which is hereinafter described.

The form of filter element produced by my improved machine, consists of a tubular metal column or core 47, of the desired length. Said column is perforated throughout the length thereof, as indicated at 48, and preferably reinforced to resist crush stresses by circumferential corrugations 49 formed therein at relatively spaced points. Packed or compressed lint-free thread material, such as cotton waste or the like, is disposed over and formed about the perforate column to constitute a cylindrically shaped filter body 50 whose opposite ends may extend slightly beyond the adjacent ends of said column, all as shown in Figure 5 of the drawings. A tubular jacket 51 of closely knit and, hence, stretchable material is snugly engaged over, about and along the column 47. One end 51' thereof is anchored, in any suitable manner, to an end of the column. The remaining portion of the jacket is carried outwardly over that end of the filter body 50 adjacent the remaining column end, reversed upon itself and tautly engaged over, about and along the outer surface of said filter body and over the opposite end of the same. The free or remaining end of the jacket is lappingly engaged over said remaining filter body end and securely tucked inwardly between it and the adjacent column end over and about the first secured end 51'.

In operation of the machine, the packing head 26 and the centering chuck 41 are positioned in the manner shown in Figure 2 of the drawings. A tubular column 47, with the knitted jacket 51 snugly engaged over the same and secured at one end 51' thereto, is positioned longitudinally of the machine bed 1 between the centering chuck and the adjacent end of the tubular mandrel 33. One end of said column is engaged over the reduced extension on the chuck and the opposite end in the adjacent open end of the mandrel. The centering chuck is now slid longitudinally inwardly over the machine bed toward the adjacent open end of the forming body 8, telescoping the column 47 in the adjacent portion of the tubular mandrel 33 until its inner end is abuttingly engaged with the stop collar 36 therein. Thereupon, the free portion of the knitted jacket 51 is reversed upon itself and tautly engaged over and along the reduced and shouldered adjacent end portion 8' of the forming body 8 in the fashion shown in Figure 4 of the drawings. The chuck carriage is then locked against relative movement on the machine bed by its screw-lock, operated by the handle 43.

A predetermined amount of filter element constituting material, such as above described, is now placed on and spread evenly over the feed table 5 and the follower 9 is closed and compressively locked thereover by the arm 11. At this time, the shaft 22 is rotated, in a predetermined direction, by its handle 25 causing the rack bars 20 and the pusher head 18 to be moved inwardly over the feed table whereby to discharge the filter element constituting material through the inletting opening in the forming body 8 thereinto and distributed partially over and about the mandrel supported tubular column 47. The pusher head and its rack bars are now returned to their initial positions with relation to the feed table, its follower 9 opened and a second predetermined charge of filter material placed on said table, as before. This second charge of filter material is moved from the feed table into the forming body 8 in the same manner as above described. As said second charge is delivered into the forming body, the leading edge thereof will irregularly engage and intimately merge with the adjacent end of the first delivered charge, forcing it over and about the inner sides of the forming body and the tubular column 47. The adjacent ends or edges of the two charges of filter material will thus be irregularly and intimately joined or interengaged in the manner indicated by the lines identified at 52 in Figure 3, and thereby, will eliminate the presence of objectionable voids in or about the same, as well as placing the material under a certain and beneficial degree of compression.

Movement of the pusher head 18, with its dished inner side 19, from the inletting opening of the forming body 8, is now prevented by locking the crank 25 against rotation by engaging its lock pin 25' with an immovable portion of the frame 6.

With the forming body 8 thus charged with filter element constituting material, the control handle 39' of the valved control 39, is operated to admit power fluid to the outer end of the ram cylinder 30. Thereby, its piston 31 will be engaged and driven through the cylinder, causing the rod 29 to thrust the elongated tubular member 27 and the packing head 26 into effectual compressing engagement with the adjacent end of the filter material in the forming body 8, to that position shown in Figure 4 of the drawings. With the packing head in such position, the filter material 50 will have been compressed to a predetermined and satisfactory degree within the forming body 8 and over and about the tubular perforate column 47.

If desired, the inner face of the centering chuck 41 may be annularly dished, as at 53, so that the engaged end of the compressed filter element constituting material will be convexed, as indicated in Figure 4.

With the packing head 26 compressingly engaging the adjacent end of the filter material 50, the screw-lock of the centering chuck carriage 42 is loosened, by turning its handle 43. When loosened, the longitudinal thrust power of the packing head 26 in the forming body 8 is entirely sufficient to effect longitudinal ejection of the now formed filter element from the open end of the forming body 8, this ejection being accomplished by the application of an outward driving force to the now released centering chuck carriage 42, causing it to be moved against the resistance of the contractile coiled spring 44 to the outward limit of its movable tracked mounting on the machine bed 1.

If desired, the centering chuck carriage screw-lock may now be engaged with an adjacent portion of the machine bed, and thereupon, the control handle 39' of the valved control 39 is operated to exhaust fluid from the first described end of the ram cylinder 30 and to admit fluid through the conduit 38, to its opposite end, causing the now advanced cylinder piston 31 to be returned to its initial starting position, as shown in dotted lines in Figure 2.

With the packing head 26 thus disengaged from the inner end of the now formed filter element, particularly due to its withdrawal from the forming body 8, by the elongated tubular member 27 and the piston rod 29, said filter element is now ready for removal from the machine.

It is to be understood, of course, that as the elongated tubular member 27 is moved to its retracted position, the tubular mandrel 33 is withdrawn through and from the tubular perforate column 47 of the filter element.

At this point, attention is directed to the fact that as the formed filter element is longitudinally ejected from the forming body 8, under the ejecting urge of the advancing packing head 26, that portion of the knitted jacket 51 engaged over the reduced end portion 8' of the forming body will be drawn over the outer peripheral portion of the filter element, completely covering or jacketing the same. The inherent elasticity of this knitted jacket will, as hereinbefore indicated, cause it to be tautly arranged over and about the compressed filter material 50. The free end of the jacket 51, as hereinbefore explained, is now turned inwardly and securingly tucked between the compressed filter element and the adjacent end of the tubular perforate column 47 adjacent the first secured end 51'.

While we have hereinbefore described, with some degree of particularity, a form of filter element which is of a somewhat elongated character, it will, of course, be fully understood and appreciated that the improved machine is capable of producing filters of shorter lengths. By the same token, and if required, the machine may be employed to produce filters of even greater length than that form hereinbefore described. In such event or events, it will be understood that the length of the tubular perforate column 47 will substantially correspond with the length of the filter element to be produced; that the length of the knitted jacket 51 will be accordingly varied, and furthehrmore, that the length of compression travel of the packing head 26, as well as the length of the tubular mandrel 43, will be appropriately modified. It is also to be understood that by simple adjustment of the valved control 39, and/or its duration of operation, the filter element constituting material 50 may be compressed or packed in the forming body 8 to any particularly desired or required degree of density.

We claim:

1. In a filter element producing machine, a filter element forming body having filter material inletting means and filter element outletting means separate from the inletting means, a packing head selectively slidable in said body towards or from its outletting means, a tubular mandrel in the body slidably engaged with and through said head, filter material feed means cooperatively associated with the body inletting means; said feed means adapted, at times, to close said inletting means, and centering and supporting means supported for movement towards and from the body outletting means and the adjacent end of said tubular mandrel and lockable against such movement.

2. In a filter element producing machine, a filter element forming body having filter material inletting means and filter element outletting means therein, said inletting means being at substantially right angles to the longitudinal axis of the body and apart from its outletting means, a packing head selectively slidable in said body towards or from its outletting means, a tubular mandrel in the body slidably engaged with and through said head, filter material feed means cooperatively associated with the body inletting means, said feed means adapted, at times, to close said inletting means, and centering and supporting means supported for movement towards or from the body outletting means and the adjacent end of said tubular mandrel and lockable against such movement.

3. In a filter element producing machine, a tubular filter element forming body having open opposite ends and a filter material inletting opening therein intermediately of its opposite ends, a packing head slidable in said body, means connected to said head for selectively moving the same in either of two directions in the forming body, a tubular mandrel in the body slidably engaged with and through said head, filter material feed means cooperatively associated with the body inletting opening, said feed means adapted, at times, to close said inletting opening, and centering and supporting means supported for movement towards and from one open end of the body and the adjacent end of said tubular mandrel and lockable against such movement.

4. In a filter element producing machine, a filter element forming body having filter material inletting means and filter element outletting means, a packing head slidable in said body, a tubular mandrel in the body spaced from its side walls and slidably engaged with and through said head, a tubular member connected to said head and extended beyond the same outwardly of same forming body, telescopically engageable, at times, over said tubular mandrel, spring thrust means in the tubular member having one end bearing on the tubular mandrel adapted to normally retain the mandrel extended from the tubular member, means connected to said tubular member for selectively moving the same in either of two directions with relation to the forming body, and centering and supporting means supported for movement towards and from the body outletting means and the adjacent end of said tubular mandrel and lockable against such movement.

5. In a filter element producing machine, a filter element forming body having open and opposite ends and a filter inletting opening in its side walls intermediately of its opposite open ends, a packing head slidable in the forming body, a tubular mandrel in and disposed longitudinally of said body in spaced relation to its side walls and endwise slidably engaged with and through said packing head, motion transmitting means connected to the packing head for selectively moving the same in either of two directions in the forming body, filter material feed means cooperatively associated with said forming body, a pusher head on said feed means movable thereover into and from said material inletting opening, means for retaining said pusher head engaged, at times, in said inletting opening, and a centering and supporting device supported for movement towards and from one of the opposite open ends of the forming body and lockable against such movement.

6. In a filter element producing machine, a filter element forming body having open opposite ends and a filter material inletting opening in its side walls intermediately of its open opposite ends, a packing head slidable in the forming body, a tubular mandrel in and disposed longitudinally of said body in spaced relation to its side walls and endwise slidably engaged with and through said packing head, motion transmitting means connected to the packing head for selectively moving the same in either of two directions in the forming body, a filter material receiving table cooperatively associated with said forming body, a pusher head on said table movable thereover into and from said material inletting opening in the forming body, one side of said pusher head being formed to correspond to and be contiguous with the adjacent portions of the inner side walls of said forming body when engaged in the material inletting opening therein, means connected to said pusher head for imparting movement in a predetermined direction thereto, other means cooperative with said pusher head movement imparting means for releasably locking the same and securing the pusher head in the forming body inletting opening, and a centering and supporting device supported for movement towards and from one of the opposite open ends of the forming body and lockable against such movement.

7. In a filter element producing machine, a filter element forming body having filter material inletting means and filter element outletting means separate from the inletting means, a packing head selectively slidable in said body towards or from its outletting means, a tubular mandrel in the body slidably engaged with and through said head, a filter material receiving table cooperatively associated with said forming body, a pusher head on said table movable thereover into and from said filter material inletting means, one side of said pusher head being formed to correspond to and be contiguous with the adjacent portions of the inner side walls of said forming body when engaged in the material inletting means therein, means connected to said pusher head for imparting movement in a predetermined direction thereto, other means cooperative with said pusher head movement imparting means for releasably locking the same and securing the pusher head in the forming body inletting means, and a centering and supporting device supported for movement towards and from the filter material inletting means of the body and lockable against such movement.

8. In a filter element producing machine, a filter element forming tubular body having filter material inletting means and filter element outletting means separate from the inletting means, a packing head selectively slidable in said body towards or from its outletting means, a tubular mandrel in the body slidably engaged with and through said head, a filter material receiving table cooperatively associated with said tubular forming body, a pusher head on said table movable thereover into and from said material inletting means in the forming body, means connected to said pusher head for imparting movement in a predetermined direction thereto, other means cooperative with said pusher head movement imparting means for releasably locking the same and securing the pusher head in the forming body inletting means, a substantially sheet-like follower movably mounted on the feed table arrangeable, at times, in spaced substantially parallelism to said table and over said pusher head, and a centering and supporting device supported for movement towards and from the filter material inletting means of the forming body and lockable against such movement.

9. A method for producing a cylindrical tubular filter element, which consists of engaging a tubular column in a forming body in spaced relation to its side walls, introducing and moving a slightly compressed body of filter material into the forming body between its inner side walls and the tubular column transversely of the longitudinal axes of said forming body and tubular column and partly thereabout, then introducing and moving a second slightly compressed body of filter material in the forming body between its said inner side walls and the tubular column transversely of the longitudinal axes thereof and concurrently forcing the first mentioned body of filter material ahead of the same whereby the entire space between the inner side walls of said forming body and tubular column are filled thereby and the adjacent contacting ends of said two filter material bodies are contacted and interengaged, then longitudinally compressing said bodies of filter material to a predetermined degree and shaping the same to the engaged inner side walls of the forming body and the tubular column, and thereupon ejecting the compressed filter material and column from the tubular forming body.

10. A method for producing a cylindrical tubular filter element, which consists of engaging a tubular column in a tubular forming body in spaced relation to its side walls, introducing and moving a slightly compressed body of filter material into the forming body between its inner side walls and the tubular column transversely of the longitudinal axes of said forming body and tubular column and partly thereabout, then introducing and moving a second slightly compressed body of filter material into the tubular forming body between its said inner side walls and the tubular column transversely of the longitudinal axes thereof and concurrently forcing the first mentioned body of filter material ahead of the same whereby the entire space between the inner side walls of said tubular forming body and tubular column are filled thereby and the adjacent contacting ends of said two filter material bodies are intimately engaged, then longitudinally compressing said bodies of filter material to a predetermined degree and shaping the same to the engaged inner side walls of the tubular forming body and the tubular column, thereupon ejecting the compressed filter material and tubular column from the tubular forming body, and concurrently with such ejection, tautly engaging a jacket over and about the outer sides and ends of said compressed filter material adjacent the opposite ends of the tubular column and securing the same between said ends of the compressed material and column.

WALTER K. MALMSTROM.
EDWARD J. SHERLOCK.

No references cited.